(12) United States Patent
Wang

(10) Patent No.: US 9,161,004 B2
(45) Date of Patent: Oct. 13, 2015

(54) IDENTIFYING PARAMETER SETS IN VIDEO FILES

(71) Applicant: Qualcomm Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/748,291

(22) Filed: Jan. 23, 2013

(65) Prior Publication Data

US 2013/0287366 A1 Oct. 31, 2013

Related U.S. Application Data

(60) Provisional application No. 61/638,393, filed on Apr. 25, 2012.

(51) Int. Cl.
*H04N 9/79* (2006.01)
*G06F 17/30* (2006.01)

(52) U.S. Cl.
CPC ............ *H04N 9/79* (2013.01); *G06F 17/30091* (2013.01); *G06F 17/30781* (2013.01); *G06F 17/30843* (2013.01); *G06F 17/30852* (2013.01)

(58) Field of Classification Search
CPC ........................................................ H04N 9/79
USPC ........................................................ 386/241
See application file for complete search history.

(56) References Cited

U.S. PATENT DOCUMENTS

| | | | |
|---|---|---|---|
| 7,725,593 B2 | 5/2010 | Visharam et al. | |
| 2004/0006575 A1* | 1/2004 | Visharam et al. | 707/104.1 |
| 2004/0218668 A1* | 11/2004 | Hannuksela et al. | 375/240.01 |
| 2005/0175098 A1 | 8/2005 | Narasimhan et al. | |
| 2006/0050793 A1* | 3/2006 | Wang et al. | 375/240.25 |
| 2006/0114988 A1 | 6/2006 | Gomila et al. | |
| 2006/0165298 A1 | 7/2006 | Kikuchi | |
| 2006/0277316 A1 | 12/2006 | Wang et al. | |
| 2007/0016594 A1* | 1/2007 | Visharam et al. | 707/100 |

(Continued)

FOREIGN PATENT DOCUMENTS

WO 2010007513 A1 1/2010

OTHER PUBLICATIONS

Amon et al., "File Format for Scalable Video Coding", IEEE Transactions on Circuits and Systems for Video Technology, IEEE Service Center, vol. 17, No. 9, Sep. 2007, pp. 1174-1185.

(Continued)

*Primary Examiner* — Thai Tran
*Assistant Examiner* — Nien-Ru Yang
(74) *Attorney, Agent, or Firm* — Shumaker & Sieffert, P.A.

(57) ABSTRACT

An apparatus is configured to store coded video data including a number of sequences of coded video pictures in an electronic file. The apparatus includes at least one processor configured to determine whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The at least one processor is also configured to provide, in the electronic file, an indication indicating whether the sample description includes all parameter sets of the particular type based on the determination.

29 Claims, 6 Drawing Sheets

(56) References Cited

U.S. PATENT DOCUMENTS

| | | | |
|---|---|---|---|
| 2008/0019446 A1 | 1/2008 | Hannuksela | |
| 2008/0225116 A1 | 9/2008 | Kang et al. | |
| 2009/0147860 A1* | 6/2009 | Pandit et al. | 375/240.26 |
| 2010/0238994 A1 | 9/2010 | Cakareski et al. | |
| 2011/0119394 A1 | 5/2011 | Wang et al. | |
| 2012/0023249 A1* | 1/2012 | Chen et al. | 709/231 |
| 2012/0189049 A1 | 7/2012 | Coban et al. | |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Chen et al., "Response to the CfP on HTTP Streaming: Adaptive Video Streaming based on AVC," MPEG Meeting; Geneva, CH (Motion Picture Expert Group or ISO/IEC JTC1/SC29/WG11), No. M17909, Jul. 26, 2010, 20 pp.

Singer et al., "ISO/IEC 14496-15/FDIS, International Organization for Standardization Organization Internationale De Normalization ISO/IEC JTC1/SC29/WG11 Coding of Moving Pictures and Audio", ISO/IEC 2003, Aug. 11, 2003, 34 pp.

Digital cellular telecommunications system (Phase 2+); Universal Mobile Telecommunications System (UMTS); LTE; Transparent end-to-end packet switched streaming service (PSS); 3GPP file format (3GP) (3GPP TS 26.244 version 9.2.0 Release 9), Technical Specification, European Telecommunications Standards Institute (ETSI), TS 124 244 v9.2.0, Release 9,Jun. 2010, 57 pp.

DVB Organization: "29n112624.doc", DVB, Digital Video Broadcasting, C/0 EBU 17A Ancienne Route-CH-1218 Grand SAC0NNEX, Geneva-Switzerland, May 28, 2010, 5 pp.

Information Technology—Coding of audio-visual object—Part 15: Advanced Video Coding (AVC) file format, Amendment 1: Sub-track definitions, ISO/IEC JTC 1/SC 29, ISO/IEC 14496-15:2010/Amd. 1:2011(E), Jul. 22, 2011, 15 pp.

International Standard ISO/IEC 13818-1:2000(E), "Information Technology—Generic Coding of Moving Pictures and Associated Audio Information: Systems," Second edition, Dec. 1, 2000, pp. 1-174.

International Standard ISO/IEC 14496-12, Information Technology—Coding of audio-visual objects—Part 12: ISO base media file format, Third Edition, Oct. 15, 2008, 120 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Vetro, "Joint Draft 8.0 on Multiview Video Coding", 28th JVT meeting, Hannover, Germany, Document: JVT-AB204 (rev.1), Jul. 20-25, 2008, available from http://wftp3.itu.int/av-arch/jvt-site/2008_07_Hannover/JVT-AB204, 73 pp.

Schierl et al., "Text of ISO/IEC 13818-1:2007/FPDAM 4—Transport of Multiview Video over ITU-T Rec H.222.0 | ISO/IEC 13818-1," ISO/IEC 13818-1:2007/FPDAM 4, Lausanne, Switzerland, 2009, pp. 1-21.

Schwarz et al., "Overview of the Scalable Video Coding Extension of the H.264/AVC Standard," IEEE Transactions on Circuits and Systems for Video Technology, Sep. 2007, pp. 1103-1120, vol. 17, No. 9.

Wiegand et al., "Text of ISO/IEC 14496-10-2005/FPDAM3 Scalable Video Coding, (in integrated form with ISO/IEC 14996-10)," Joint Video Team (JVT) of ISO/IEC MPEG & ITU-T VCEG (ISO/IEC JTC1/SC29/WG11 and ITU-T SG16 0.6), Oct. 2006, Hangzhou, China, 529 pp.

Sullivan et al., "Editors' draft revision to ITU-T Rec. H.264 | ISO/IEC 14496-10 Advanced Video Coding—in preparation for ITU-T SG 16 AAP Consent (in integrated form)", Joint Video Team (JVT) of ISO/IEC MPEG & ITU-T VCEG (ISO/IEC JTC1/SC29/WG11 and ITU-T SG16 Q.6) 30th Meeting: Geneva, CH, Jan. 29-Feb. 3, 2009, pp. 1-683.

Rathgen et al., "Proposal for SVC File Format Specification," MPEG Meeting; MPEG2005/M12345, Jul. 2005, Poznan, Poland, 34 pp.

Weigand et al., "Joint Draft ITU-T Rec. H.264 | ISO/IEC 14496-10 / Amd.3 Scalable video coding", Joint Video Team (JVT) of ISO/IEC MPEG & ITU-T VCEG (ISO/IEC JTC1/SC29/WG11 and ITU-T SG16 Q.6) 24th Meeting: Geneva, Switzerland, Jun. 29-Jul. 5, 2007, pp. 1-559.

Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), Jun. 2010, 178 pp.

Wenger et al., RFC 3984, "RTP Payload Format for H.264 Video," Feb. 2005, 84 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 6," 8th Meeting: San Jose, CA, USA, Feb. 1-10, 2012, JCTVC-H1003, 259 pp.

International Search Report and Written Opinion—PCT/US2013/033826—ISA/EPO—Jul. 5, 2013, 10 pp.

"International Standard ISO/IEC 14496-12 Information technology Coding of audio-visual objects Part 12: ISO base media file format", Internet Citation, Oct. 1, 2005, 94 pp., retrieved from the Internet: URL:http://www.iso.org/iso/iso_catalogue/catalogue_ics/catalogue_detail_ics.htm?csnumber=41828 (retrieved on Aug. 11, 2010).

"ISO/IEC 14496-15:2004 Information technology—Coding of audio-visual objects—Part 15: Advanced Video Coding (AVC) file format", International Standard ISO/IEC, vol. 14496-15, Apr. 15, 2004, 30 pp.

Second Written Opinion from corresponding PCT Application Serial No. PCT/US2013/033826, dated Mar. 21, 2014, 5 pp.

International Preliminary Report on Patentability from corresponding PCT Application No. PCT/US2013/033826 dated Jul. 29, 2014 (19 pages).

* cited by examiner

IDENTIFYING PARAMETER SETS IN VIDEO FILES

This application claims the benefit of U.S. Provisional Application No. 61/638,393, filed Apr. 25, 2012, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. Regardless of the particular methods, after video data has been encoded, the video data can be packetized for transmission or storage. The video data may be assembled into a video file conforming to any of a variety of standards, such as the International Organization for Standardization (ISO) base media file format (ISOBMFF) and extensions thereof, such as the AVC file format.

SUMMARY

In general, this disclosure describes techniques for storage and transport of video data. This disclosure provides techniques for specifying whether all parameter sets of a particular type are stored in a so-called "sample description" included in the video file independently of other types of parameter sets.

One example includes a method of storing coded video data comprising a plurality of sequences of coded video pictures in an electronic file. The method includes determining whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The method also includes providing, in the electronic file, an indication indicating whether the sample description includes all parameter sets of the particular type based on the determination.

In another example, an apparatus is configured to store coded video data including a number of sequences of coded video pictures in an electronic file. The apparatus includes at least one processor configured to determine whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The at least one processor is also configured to provide, in the electronic file, an indication indicating whether the sample description includes all parameter sets of the particular type based on the determination.

Another example includes a computer-readable storage medium having stored thereon instructions that when executed cause one or more processors to perform operations including determining whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The instructions, when executed, also cause one or more processors to perform operations including providing, in the electronic file, an indication indicating whether the sample description includes all parameter sets of the particular type based on the determination.

Another example includes an apparatus for storing coded video data comprising a plurality of sequences of coded video pictures in an electronic file. The apparatus includes means for determining whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The apparatus also includes means for providing, in the electronic file, an indication indicating whether the sample description includes all parameter sets of the particular type based on the determination.

Another example includes a method of processing coded video data comprising a plurality of sequences of coded video pictures stored in an electronic file. The method includes receiving an indication in the file indicating whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The method also includes determining whether all parameter sets of the particular type are stored in the sample description based on the indication and processing the coded video data based at least in part on one or more of the parameter sets of the particular type based on the determination of whether all parameter sets of the particular type are stored in the sample description.

Another example includes an apparatus for storing coded video data comprising a plurality of sequences of coded video pictures in an electronic file. The apparatus includes at least one processor configured to receive an indication in the file indicating whether a sample description associated with at least one sample includes all parameter sets of a particular type associated with the at least one sample. The at least one sample comprises at least a portion of the plurality of sequences of coded video pictures. The particular type is one of a plurality of different particular types of parameter sets. The at least one processor is also configured to determine whether all parameter sets of the particular type are stored in the sample description based on the indication and process the coded video data based at least in part on one or more of the parameter sets of the particular type base on the determination of whether all parameter sets of the particular type are stored in the sample description.

The details of one or more examples are set forth in the accompanying drawings and the description below. Other features, objects, and advantages will be apparent from the description and drawings, and from the claims.

DETAILED DESCRIPTION

Figure 1:
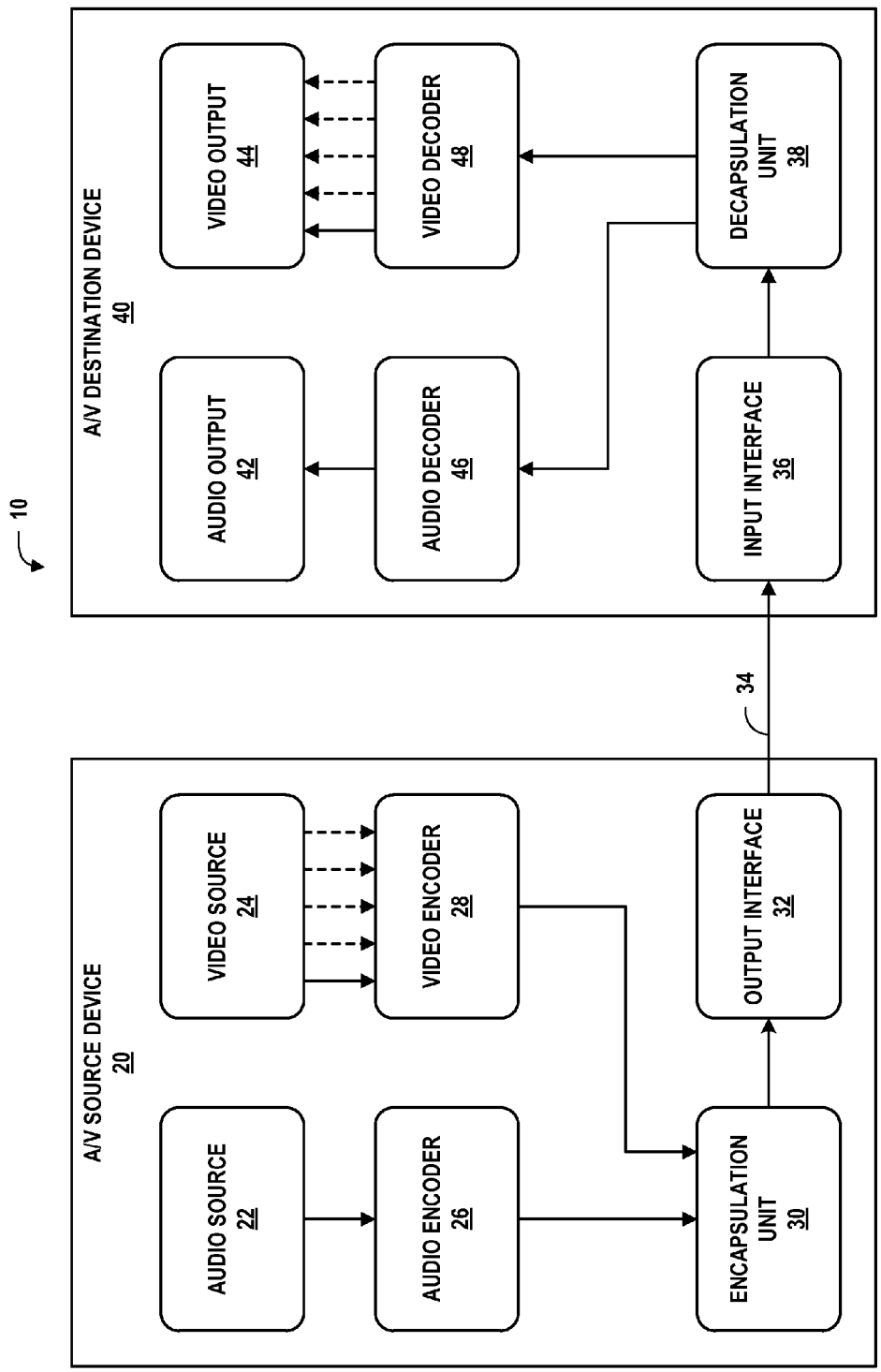
FIG. 1 is a block diagram illustrating an example system in which an audio/video (A/V) source device transfers audio and video data to an A/V destination device.

In general, techniques are described for storing video content in a file. In particular, the techniques relate to various methods for storing high-efficiency video coding (HEVC) video content in a file based on International Standards Organization (ISO) base media file format (ISOBMFF). The techniques may enable specification of whether all parameter sets of a particular type are stored in a so-called "sample description" included in the video file independently of other types of parameter sets. The techniques may extend what is sometimes referred to as decoder configuration records, which is a syntax structure included in the sample description, to include one or more flags indicating whether all parameter sets of a particular type are stored in the sample description. The disclosed examples enable distinguishing whether all parameter sets of a particular type are included in the sample description, which, in turn, can allow determinations as to when to perform out-of-band transport of parameter sets of different types. In this manner, the disclosed examples can enable more efficient storage, processing, and transmission of coded video data, which, in turn, can improve the performance of video coding devices such as video encoders and decoders.

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks, e.g. macroblocks. Each macroblock can also be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

After video data has been encoded, the video data may be packetized for transmission or storage. The video data may be assembled into a video file conforming to any of a variety of standards, such as ISOBMFF. Additional example standards include Scalable Video Coding (SVC) file format, Advanced Video Coding (AVC) file format, Third Generation Partnership Project (3GPP) file format, and/or Multiview Video Coding (MVC) file format, or other similar video file formats.

In one example, a file encapsulation unit or other device receives elementary streams comprising video data from a video encoder and elementary streams comprising audio data from an audio encoder. AV data along with parameters/attributes related thereto, e.g., bitrate, frame rate, resolutions, codec type (for video and/or audio data), language, etc. may form an AV "representation."

The term "representation" may be used to refer to a section of encoded audio or video data corresponding to a particular period of the multimedia content and encoded in a particular way. Each individual stream of AV data can be referred to as an elementary stream. An elementary stream is a single, digitally-coded (possibly compressed) component of a representation. For example, the coded video or audio part of the representation can be an elementary stream. Additionally, information regarding parameters related to the video data included in a video elementary stream, e.g. sequence parameter sets as described below, may be included in a parameter set elementary stream.

In some examples, the video and audio encoder may each include packetizers for forming packetized elementary streams (PES) packets from encoded data. In other examples, the video and audio encoder may each interface with respective packetizers for forming PES packets from encoded data. In still other examples, the encapsulation unit may include packetizers for forming PES packets from encoded audio and video data.

The encapsulation unit can receive PES packets for elementary streams of a representation from the audio and video encoder and form corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized as Video Coding Layer (VCL) NAL units and non-VCL NAL units. VCL units may contain the core compression engine and may include block, macroblock, and/or slice level data. Non-VCL NAL units may include parameter set NAL units, among others.

Parameter sets were introduced in H.264/AVC in response to the effects of a loss of the sequence header and picture header, if, e.g., a picture is partitioned into multiple segments (also referred to as slices) and those segments are transported in their own transport unit (e.g. RTP packet). The loss of the first packet of a picture, which carries not only the first picture segment data, but also the picture header, might lead to a completely incorrectly reconstructed picture (and sometimes also the following pictures), even if all other packets were not lost. Some decoder implementations would not even attempt to decode the received packets of a picture, if the packet with the picture header was lost.

Parameter sets can be either part of the video bitstream or can be received by a decoder through other means (including out-of-band transmission using a reliable channel, hard coding in encoder and decoder, and so on). A parameter set contains an identification, which is referenced, directly or indirectly, from, e.g., a slice header corresponding to a slice of a picture included in a coded video sequence. The referencing process is known as "activation." Depending on the parameter set type, the activation can occur once per picture or once per sequence. The concept of activation through referencing was introduced, among other reasons, because implicit activation by virtue of the position of the information in the bitstream (as common for other syntax elements of a video codec) is not available in the case of out-of-band transmission.

HEVC includes a number of different types of parameter sets that apply to different levels of granularity of the video data, e.g. picture, sequence, layer, of a coded video sequence. The parameter sets included in HEVC are picture parameter sets (PPSs), sequence parameter sets (SPSs), and video parameter sets (VPSs). A VPS conveys information that is applicable to multiple layers as well as sub-layers. Examples of multi-layer video sequences include, e.g., multiple versions of the same video stream that include representations that differ by resolution, bit rate, frame rate, etc. Each layer of a given video sequence, regardless of whether such layers have the same or different SPSs, may generally refer to the same VPS. A VPS can convey information including (1) common syntax elements shared by multiple layers or operation points, in order to avoid unnecessary duplications; (2) information of operation points needed for session negotiation, including e.g., profile and level; and (3) other operation point specific information, which does not belong to one SPS. Examples of other operation point-specific information that does not belong to one SPS may include Hypothetical Reference Decoder (HRD) parameters for layers or sub-layers.

SPSs contain information which may apply to all slices of a coded video sequence. In HEVC, a coded video sequence starts from an instantaneous decoding refresh (IDR) picture, a clean random access (CRA) picture, or a broken link access (BLA) that is the first picture in the bitstream, and includes all subsequent pictures that are not an IDR or BLA picture. A bitstream consists of one or more coded video sequences. The content of an SPS can be divided into a number of categories of information, including, e.g.: (1) a self-reference (its own ID); (2) decoder operation point related (profile, level, picture size, number sub-layers, and so on); (3) enabling flags for certain tools within a profile, and associated coding tool parameters in case the tool is enabled; (4) information restricting the flexibility of structures and transform coefficient coding; (5) temporal scalability control; and (6) Visual Usability Information (VUI), which includes Hypothetical Reference Decoder (HRD) information.

PPSs contain information that may change from picture to picture in a coded video sequence. The content of a PPS can be divided into a number of categories of information, including, e.g.: (1) a self-reference; (2) initial picture control information such as initial quantization parameter (QP), a number of flags indicating the use of, or presence of, certain tools or control information in the slice (sequence) header; and (3) tiling information.

The ISO Base Media File Format (ISOBMFF, ISO/IEC 14496-12) is designed to contain timed media information for a media presentation in a flexible, extensible format that facilitates interchange, management, editing, and presentation of the media. ISOBMFF is specified in MPEG-4 Part-12, which defines a general structure for time-based media files. The ISOBMFF is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. The ISO base media file format contains the timing, structure, and media information for timed sequences of media data, such as audio-visual presentations. The file structure is object-oriented. A file can be decomposed into basic objects and the structure of the objects is implied from their type.

In the ISO base media file format, the overall presentation is called a movie, which is logically divided into tracks. Some tracks can represent a timed sequence of media (frames of video, for example). Additionally, tracks can contain other data such as media attributes/parameters, including, e.g., parameter sets by which coded video data can be decoded by a decoder device that receives the data encapsulated in the file. Within each track, each timed unit is called a sample, which could be, e.g., a frame of video or audio. Samples are implicitly numbered in sequence. Each track has one or more sample descriptions and each sample in the track is tied to a description by reference. The description defines how the sample may be decoded (e.g. the description identifies the compression algorithm used).

Unlike some other multi-media file formats, the ISO base media file format, separates several concepts that are sometimes linked. The physical structure of the file may not be tied to the physical structures of the media itself. For example, the physical structure of the file and the layout of the media need not be tied to the time ordering of the media. Frames of video need not be laid down in the file in time order (though they may be). However, file structures can be used to describe the placement and timing of the media. Such file structures can permit, but not require, time-ordered files.

Data within a file can be encapsulated in boxes. Metadata, including that defining the placement and timing of the media, can be contained in structured boxes and the media data (frames of video, for example) can be referred to by this metadata. The media data can be in the same file (contained in one or more boxes), or can be in other files. For example, the metadata permits referring to other files by means of URLs. The placement of the media data within these secondary files is entirely described by the metadata in the primary file. Such secondary files need not be formatted to this specification, though they may be; it is possible that there are no boxes, for example, in these secondary media files.

Tracks can be of various kinds Video tracks contain samples that are visual and audio tracks contain audio media. Files may also include hint tracks, which contain instructions for a streaming server regarding how to form packets for a streaming protocol, from the media tracks in a file. Hint tracks can be ignored when a file is read for local playback. The ISO base media file format also allows for other tracks.

Extensions of the ISO base media file format have been formulated for a number of different coded video standards, including HEVC. In accordance with such extensions of the ISO base media file format, parameter sets, including the VPSs, SPSs, and PPSs can be associated with the video elementary stream, which is in the video track of the video. Additionally, parameter sets can also be stored in the sample description associated with a sample. It is also possible to have the parameter sets in another track, called a parameter set track, which includes a parameter set elementary stream containing the samples that are formed from one or more of the SPS, PPS, and/or VPS non-VCL parameter set NAL units.

Sample descriptions associated with samples of video indicate the location of parameter sets. The sample description provides a syntax structure by which sample attribute information may be communicated to a device such as a video decoder. Previous HEVC file formats specified that either all parameter sets of all types are included in the sample description or all parameter sets of all types may be stored in the sample description and the samples. In some cases, however, it can be useful to distinguish whether a particular type of parameter sets are included in the sample description, e.g. to determine when to perform out-of-band transport of one or more of VPSs, SPSs, and PPSs.

To facilitate determining whether all parameter sets of a particular type is included in a sample description or associated sample, or in some other location, e.g., a parameter set track, the techniques of this disclosure enable indications to be specified in the encapsulated file, e.g., in the sample description, which individually indicate whether each type of parameter sets are included in the sample description, in the sample data or both, or in some other location. In one example, one indication for each type of parameter sets is included in the decoder configuration record, which is a syntax structure that forms part of the sample description.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, includes audio source 22, video source 24, audio encoder 26, video encoder 28, encapsulation unit 30, and output interface 32. Audio source 22 may include, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In this manner, the techniques described in this disclosure may be applied to live, streaming, real-time audio and video data or to archived, pre-recorded audio and video data.

Video source 24 may provide a single or multiple simultaneous views of a scene. For example, video source 24 may correspond to one camera or a camera array, e.g., two or more cameras each separated by some amount of distance, such that each of the cameras in the array is directed to an approximately common focal point. In a multiple camera arrangement, each of the cameras may provide a slightly different perspective of the scene.

Video source 24 may also provide multiple simultaneous views using other techniques. For example, video source 24 may provide one view and depth information for objects in a scene. The depth information may be used to generate a second view from a second, virtual camera perspective. Video source 24 may include a processor to generate the second view, or a preprocessing unit for video encoder 28 may generate the second view. In some examples, video source 24 may comprise a computer that generates computer graphics using two or more camera perspectives.

Audio frames that correspond to video frames are generally audio frames containing audio data that was captured by audio source 22 contemporaneously with video data captured by video source 24 that is contained within the video frames. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

To encode the video data received from video source 24, video encoder 28 performs intra and/or inter-prediction to generate one or more prediction blocks. Video encoder 28 subtracts the prediction blocks from the original video blocks to be encoded to generate residual blocks. Thus, the residual blocks can represent pixel-by-pixel differences between the blocks being coded and the prediction blocks. Video encoder 28 can perform a transform on the residual blocks to generate blocks of transform coefficients. Following intra- and/or inter-based predictive coding and transformation techniques, video encoder 28 can quantize the transform coefficients. Following quantization, entropy coding can be performed by encoder 28 according to an entropy coding methodology.

A coded video block generated by video encoder 28 can be represented by prediction information that can be used to create or identify a predictive block, and a residual block of data that can be applied to the predictive block to recreate the original block. The prediction information can include motion vectors used to identify the predictive block of data. Using the motion vectors, video decoder 48 may be able to reconstruct the predictive blocks that were used by video encoder 28 to code the residual blocks. Thus, given a set of residual blocks and a set of motion vectors (and possibly some additional syntax), video decoder 28 can reconstruct a video frame or other block of data that was originally encoded. Inter-coding based on motion estimation and motion compensation can achieve relatively high amounts of compression without excessive data loss, because successive video frames or other types of coded units are often similar. An encoded video sequence may include blocks of residual data, motion vectors (when inter-prediction encoded), indications of intra-prediction modes for intra-prediction, and syntax elements.

Video encoder 28 may also utilize intra-prediction techniques to encode video blocks relative to neighboring video blocks of a common frame or slice or other sub-portion of a frame. In this manner, video encoder 28 spatially predicts the blocks. Video encoder 28 may be configured with a variety of intra-prediction modes, which generally correspond to various spatial prediction directions.

Video encoder 28 can apply transform, quantization, and entropy coding processes to further reduce the bit rate associated with communication of residual blocks resulting from encoding source video data provided by video source 24. Transform techniques can include, e.g., discrete cosine transforms (DCTs) or conceptually similar processes. Alternatively, wavelet transforms, integer transforms, or other types of transforms may be used. Video encoder 28 can also quantize the transform coefficients, which generally involves a process to possibly reduce the amount of data, e.g., bits used to represent the coefficients. Entropy coding can include processes that collectively compress data for output to a bitstream. The compressed data can include, e.g., a sequence of coding modes, motion information, coded block patterns, and quantized transform coefficients. Examples of entropy coding include context adaptive variable length coding (CAVLC) and context adaptive binary arithmetic coding (CABAC).

Video encoding and decoding by source device 20 and destination device 40 can support a number of different video coded block sizes for intra-prediction, such as 16 by 16, 8 by 8, or 4 by 4 for luma components, and 8×8 for chroma components. Additionally, source device 20 and destination device 40 can support a number of different video coded block sizes for inter-prediction, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Blocks may have different numbers of pixels in the horizontal and vertical dimensions. That is, blocks may include N×M pixels, where N is not necessarily equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

Referring again to FIG. 1, video source 24 can provide one or more views of a scene to video encoder 28 or may provide the information directly to encapsulation unit 30. Encapsulation unit 30 can receive elementary streams including encoded video data from video encoder 28 and elementary streams including audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Encapsulation unit 30 can receive PES packets for elementary streams of a representation from audio encoder 26 and video encoder 28 and form corresponding network abstraction layer (NAL) units from the PES packets. Within the same representation, a stream ID may be used to distinguish the PES-packets belonging to one elementary stream from the other. The basic unit of data of an elementary stream can be a PES packet. Thus, each view of MVC video data can correspond to respective elementary streams. Similarly, audio data corresponds to one or more respective elementary streams. In addition to media elementary streams, encapsulation unit 30 can receive other types of elementary streams, including, parameter sets streams corresponding to parameter sets by which the video data encoded by video decoder 28 can by decoded by a decoding device like video decoder 48 of A/V destination device 40.

The techniques of this disclosure are generally directed to the storage and transport of encoded multimedia (e.g., audio and video) data, and reception and subsequent interpretation and decoding of the transported multimedia data. For example, the techniques of this disclosure enable indications to be specified in an encapsulated video file, which individually indicate whether each type of parameter sets, e.g. VPSs, SPSs, and PPSs are included in a sample description associated with a sample, in sample data, both the sample description and the sample, or in some other location.

In one example, encapsulation unit 30 analyzes elementary streams received from video encoder 28 and determines whether all parameter sets of a particular type associated with a sample are stored in a sample description associated with the sample. Encapsulation unit 30 can then provide an indication in a file created from the elementary streams, which indicates whether all parameter sets of the particular type are stored in the sample description. Additional details regarding this and other functions of encapsulation unit 30 in accordance with this disclosure are provided below with reference to FIGS. 2-5.

In one example, encapsulation unit 30 receives PES packets for elementary streams of a representation from audio encoder 26 and video encoder 28 and forms corresponding NAL units from the PES packets. Organizing coded video segments into NAL units can provide a "network-friendly" video representation of the data to address applications such as video telephony, storage, broadcast, or streaming. NAL units can be categorized as Video Coding Layer (VCL) NAL units and non-VCL NAL units. VCL units may contain the core compression engine and may include block, macroblock, and/or slice level data. Other NAL units may be non-VCL NAL units.

Non-VCL NAL units may include parameter set NAL units and Supplemental Enhancement Information (SEI) NAL units, among others. Parameter sets may contain different header information for different levels of granularity of video data, e.g. sequence and picture. Parameters encapsulated in parameter NAL units can include VPSs, SPSs, and PPSs. With parameter sets, infrequently changing information need not to be repeated for each sequence or picture, hence coding and transmission efficiency may be improved. For example, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

SEI may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

A NAL unit including video data in its payload may include various granularity levels of video data. For example, a NAL unit may include a block of video data, one or more macroblocks, a slice of video data, or an entire frame of video data.

In one example, encapsulation unit 30 assembles access units from a number of NAL units. In general, an access unit can include one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to destination device 40. In one example, the video data can be transferred to input interface 36 of A/V destination device 40 via link 34. In some examples, source device 20 includes a modem that modulates video data transmitted to destination device 40 according to a communication standard, e.g., such as code division multiple access (CDMA) or another communication standard. A modem may include various mixers, filters, amplifiers or other components designed for signal modulation. Output interface 32 may include circuits designed for transmitting data, including amplifiers, filters, and one or more antennas. In some examples, rather than transmitting over a communication channel, e.g., over link 34, source device 20 can store encoded video data onto a storage device, such as a digital video disc (DVD), Blu-ray disc, flash drive, or the like.

A/V destination device 40, in the example of FIG. 1, includes audio output 42, video output 44, audio decoder 46, video decoder 48, decapsulation unit 38, and input interface 36. In destination device 40, video decoder 48 ultimately receives and decodes the encoded video data. For example, input interface 36 of destination device 40 receives information over link 34 or from a storage device, which is then decapsulated by decapsulation unit 38. Video decoder 48 receives decapsulated video data from decapsulation unit 38. In some examples, destination device 40 includes a modem that demodulates the information. Like output interface 32, input interface 36 may include circuits designed for receiving data, including amplifiers, filters, and one or more antennas. In some instances, output interface 32 and/or input interface 36 may be incorporated within a single transceiver component that includes both receive and transmit circuitry. A modem may include various mixers, filters, amplifiers or other components designed for signal demodulation. In some instances, a modem may include components for performing both modulation and demodulation.

Decapsulation unit 38 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In one example, video decoder 48 entropy decodes the received encoded video data 8, such as a coded block, according to an entropy coding methodology, such as CAVLC or CABAC, to obtain the quantized coefficients. Video decoder 48 applies inverse quantization (de-quantization) and inverse transform functions to reconstruct the residual block in the pixel domain. Video decoder 48 also generates a prediction block based on control information or syntax information (e.g., coding mode, motion vectors, syntax that defines filter coefficients and the like) included in the encoded video data. Video decoder 48 calculates a sum of the prediction block and the reconstructed residual block to produce a reconstructed video block for display.

In one example, video output 44 includes one or more display devices, which are configured to display the decoded video data to a user including, e.g., multi-view video including destination view(s) synthesized based on depth information included in a reference view or views. Display devices forming part or all of video output 44 can include any of a variety of one or more display devices such as a cathode ray tube (CRT), a liquid crystal display (LCD), a plasma display, an organic light emitting diode (OLED) display, or another type of display device. In some examples, video output 44 includes a display device capable of three-dimensional playback. For example, video output 44 can include a stereoscopic display, which is used in conjunction with eyewear worn by a viewer.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, and/or decapsulation unit 38 may comprise an integrated circuit, a microprocessor, and/or a wireless communication device, such as a cellular telephone.

Figure 2:
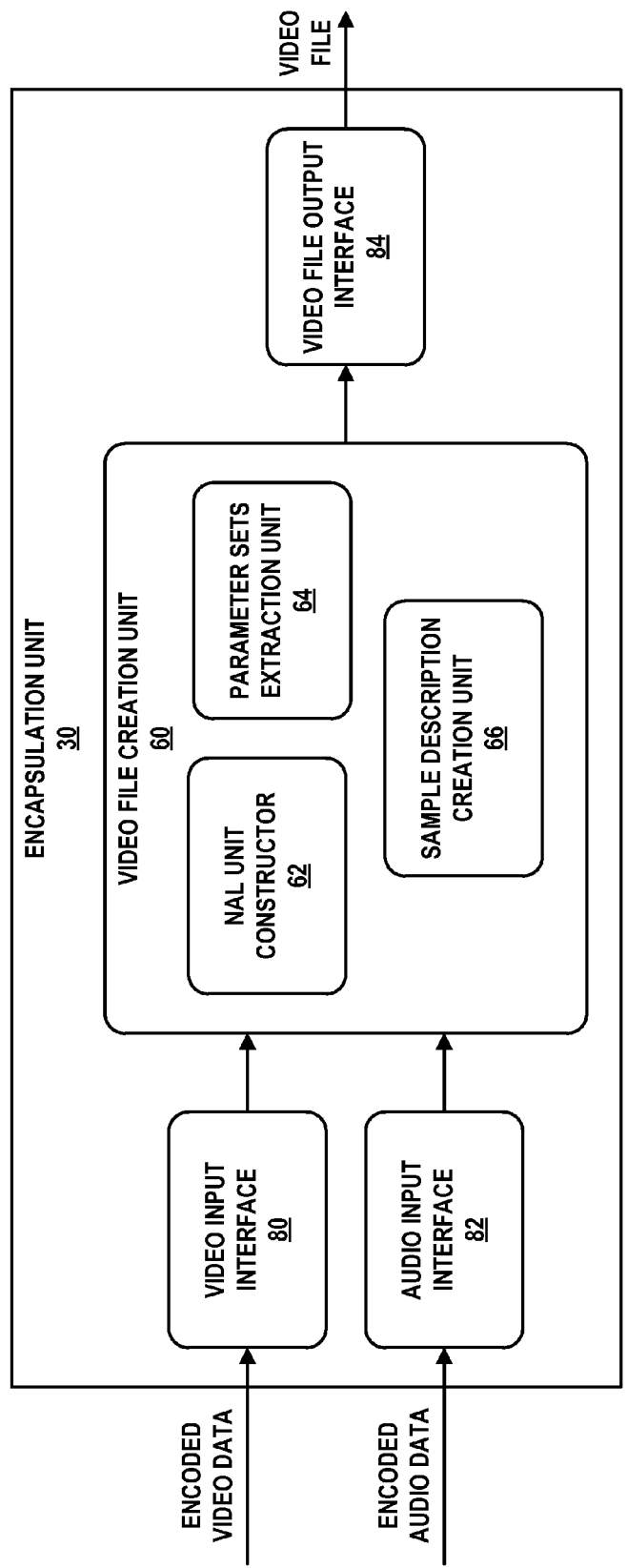
FIG. 2 is a block diagram illustrating components of an example encapsulation unit.

FIG. 2 is a block diagram illustrating components of an example encapsulation unit 30. In the example of FIG. 2, encapsulation unit 30 includes video input interface 80, audio input interface 82, video file creation unit 60, and video file output interface 84. Video file creation unit 60, in this example, includes network abstraction layer (NAL) unit constructor 62, parameter sets extraction unit 64, and sample description creation unit 66.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to video file creation unit 60 for assembly into a video file.

Video file creation unit 60 may correspond to a control unit including hardware, software, and/or firmware configured to perform the functions and procedures attributed thereto. The control unit may further perform the functions attributed to encapsulation unit 30 generally. For examples in which video file creation unit 60 is embodied in software and/or firmware, encapsulation unit 30 may include a computer-readable medium comprising instructions for video file creation unit 60 and a processing unit to execute the instructions. Each of the sub-units of video file creation unit 60 (NAL unit constructor 62, parameter sets extraction unit 64, and sample description creation unit 66, in this example) may be implemented as individual hardware units and/or software modules, and may be functionally integrated or further separated into additional sub-units. Video file creation unit 60 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 60 may further include a non-transitory computer-readable medium storing instructions for any or all of NAL unit constructor 62, parameter sets extraction unit 64, and sample description creation unit 66, as well as a processor for executing the instructions.

In general, video file creation unit 60 may create a video file including the received audio and video data. NAL unit constructor 62 may form NAL units including encoded video and audio samples. Video file creation unit 60 may further be configured to assemble access units including all NAL units for a particular time instance. Furthermore, video file creation unit 60 may be configured to decouple sequence level SEI messages from encoded video pictures described by the sequence level SEI messages, and store the sequence level SEI messages in the video file separately from the encoded video pictures described by the sequence level SEI messages.

Video encoder 28 (FIG. 1) may include data other than video data with samples of video data. Encoded video data received by video input interface 80 of encapsulation unit 30 from video encoder 28 can include, e.g., data representing parameter sets such as VPSs, SPSs, and PPSs, as well as SEI messages for samples of encoded video. In the context of an encapsulated video file, samples may refer to samples of video encoded data as well as samples of other data, including samples including data forming portions of parameter sets that can be used by a video decoder, e.g. video decoder 48 of destination device 40 to decode encoded video data also included in the encapsulated video file created by encapsulation unit 30.

In examples according to this disclosure, video file creation unit 60 of encapsulation unit 30 is configured to store parameter sets data received as part of the encoded video data in particular locations and provide indications in the encapsulated file indicating where the parameter sets are located. For example, video file creation unit 60 of encapsulation unit 30 is configured to store parameter sets data in a sample description associated with a video sample, in sample data, both the sample description and the sample, or in some other location.

As noted above, video file creation unit 60 includes parameter sets extraction unit 64 and sample description creation unit 66. In one example, parameter sets extraction unit 64 is configured to extract parameter set data from the encoded video data received by video input interface 80 of encapsulation unit 30. Parameter sets extraction unit 64 can, in one example, identify parameter sets data and thereby distinguish this data from encoded video data. Additionally, parameter sets extraction unit 64 can separate parameter sets data from encoded video data.

Parameter sets extraction unit 64 of video file creation unit 60 can also be configured to store the parameter sets data in a number of different locations in the encapsulated video file. In one example, parameter sets extraction unit 64 is configured to store part or all of the parameter sets data in one or more sample descriptions associated with samples of video data. In another example, parameter sets extraction unit 64 is configured to store the parameter sets data in locations other than sample descriptions, including with the video samples in a video track, or in a separate track of the encapsulated video file like a parameter sets track. In parameter sets data is stored separate from the sample descriptions and the video samples, in some examples, parameter sets extraction unit 64 can create a file separate from the encapsulated video file in which to store and by which to transmit some or all of the parameter sets data.

Sample description creation unit 66 of video file creation unit 60 is configured to generate sample descriptions associated with samples of video. As noted above, in a file formatted in accordance with the ISO base media file format, the overall media presentation is referred to as a movie. The movie is logically divided into tracks. Some tracks can represent a timed sequence of media (frames of video, for example). Additionally, tracks can contain other data such as media attributes/parameters, including, e.g., parameter sets by which coded video data can be decoded by a decoder device that receives the data encapsulated in the file. Within each track, each timed unit is called a sample, which could be, e.g., a frame of video or audio. Each track has one or more sample descriptions and each sample in the track is tied to a description by reference. The sample description provides a syntax structure by which sample attribute information may be communicated to a device such as a video decoder. The sample description defines how the sample may be decoded (e.g. the description identifies the compression algorithm used). Sample description creation unit 66 is configured to generate sample descriptions associated with samples of video included in the encoded video data received by video input interface 80 of encapsulation unit 30.

Among other information, in one example, sample descriptions generated by sample description creation unit 66 indicate the location of parameter sets. Previous HEVC file formats specified that either all parameter sets of all types are included in the sample description or all parameter sets of all types may be stored in the sample description and the samples. In some cases, however, it can be useful to distinguish whether a particular type of parameter sets are included in the sample description, e.g. to determine when to perform out-of-band transport of one or more of VPSs, SPSs, and PPSs.

Figure 3:
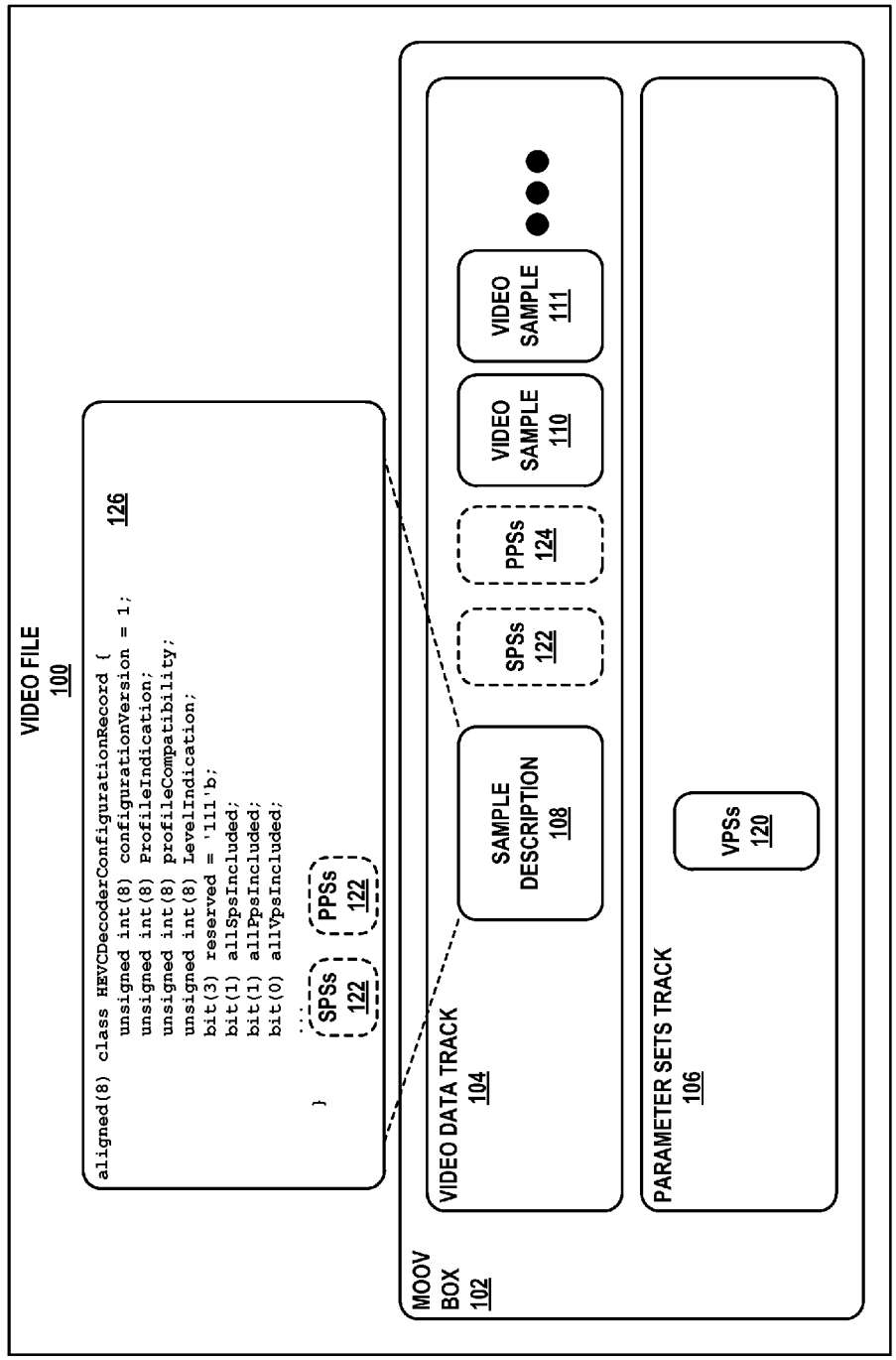
FIG. 3 is a conceptual diagram illustrating elements of an example video file.
Figure 4:
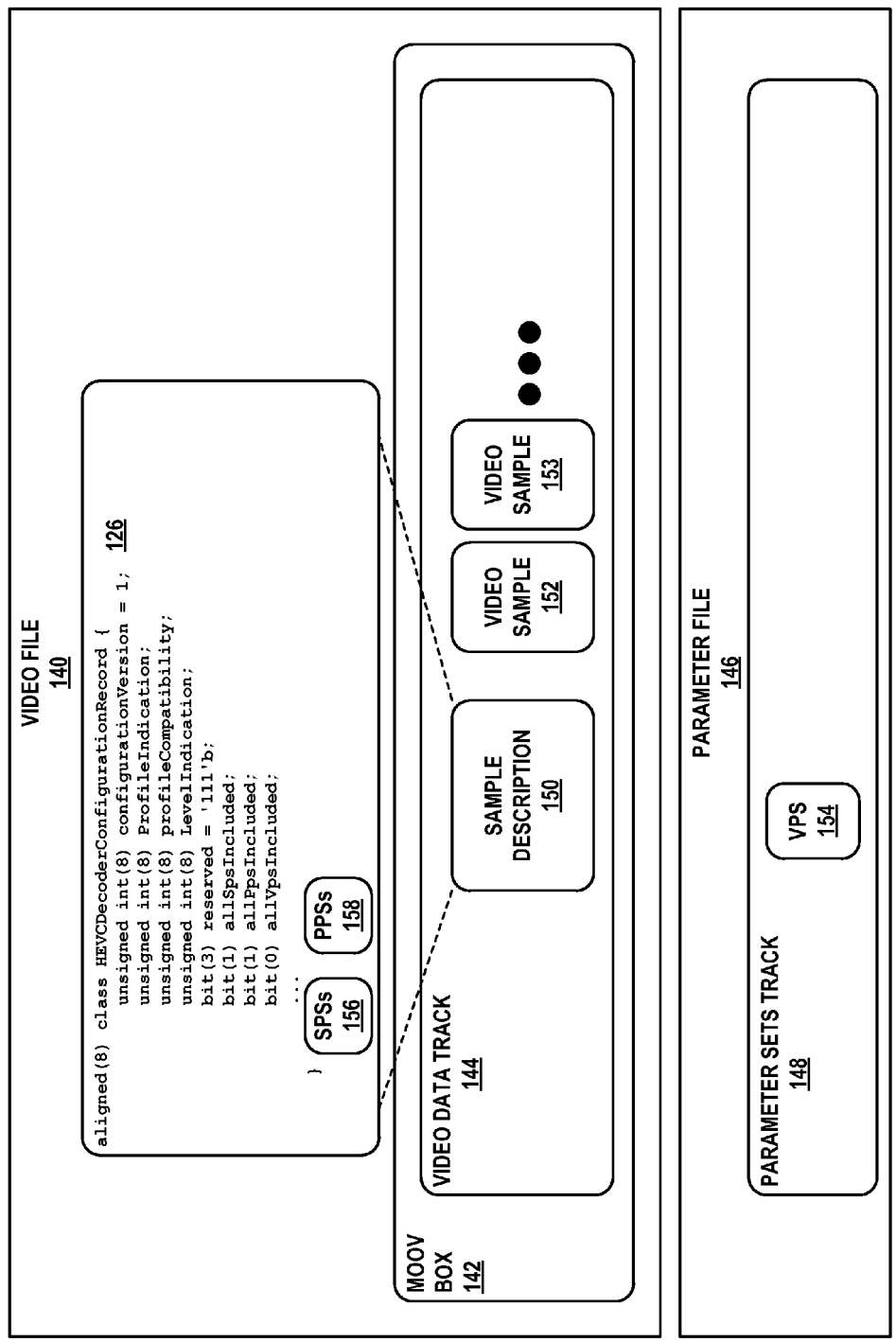
FIG. 4 is a conceptual diagram illustrating elements of another example video file.

To facilitate determining whether all parameter sets of a particular type is included in a sample description or in some other location, e.g., a parameter set track, the techniques of this disclosure enable indications to be specified by sample description creation unit 66 in a sample description, which individually indicate where each type of parameter sets are stored. In one example, sample description creation unit 66 provides one indication for each type of parameter sets, e.g. each of VPSs, SPSs, and PPSs in the decoder configuration record. The decoder configuration record is a syntax structure that forms part of the sample description. FIGS. 3 and 4 illustrate examples of files created by encapsulation unit 30, which include indications of the location of parameter sets associated with samples of video stored in the files.

FIG. 3 is a conceptual diagram illustrating example video file 100 encapsulated by encapsulation unit 30. Video file 100 includes moov box 102, which includes video data track 104 and parameter sets track 106. Video file 100 or other encapsulated video files in accordance with this disclosure can include many more than two tracks, including, multiple video and audio data tracks as well as multiple parameter set tracks. In FIG. 3, video data track 104 includes sample description 108 and an associated sequence of video samples including video samples 110 and 11. Video data track 104 can include more video samples and additional sample descriptions.

Moov box 102 forms the basic storage container for video data included in the ISO base media file format video file 100. As noted above, in practice, moov box 102 can include a number of different tracks, including video data, audio data, and, in some cases, parameter sets tracks. In example video file 100 of FIG. 3, moov box 102 includes video data track 104 and parameter sets track 106. Each of video data track 104 and parameter sets track 106 can represent a timed sequence of media or other information (frames of video, for example). Within each track, each timed unit is called a sample, which could be, e.g., a frame of video or audio, or a sample of data representing parameter sets by which samples of video are decoded.

In one example, sample description 108 is generated by sample description creation unit 66 based at least in part on where in video file 100 parameter sets associated with video samples 110 and 111 are stored. In the example of FIG. 3, parameter sets associated with video samples 110 and 111 include a number of different types of parameter sets, including VPSs 120, SPSs 122, and PPSs 124. VPSs 120 are stored in parameter sets track 106, while SPSs 122 and PPSs 124 are stored either in sample description 108 or in with video samples 110 and 111, or both.

Sample description creation unit 66 can generate sample description 108 by determining where parameter sets are stored in video file 100, e.g., by parameter sets extraction unit 64. In one example, sample description creation unit 66 determines that VPSs 120 are stored in parameter sets track 106 of video file 100, while SPSs 122 and PPSs 124 are stored in sample description 108 associated with video samples 110 and 111. In such a case, sample description creation unit 66 can provide indications of the parameter sets locations in video file 100 in decoder configuration record 126, which is a syntax structure included in sample description 108.

An example implementation is provided below. In particular, the syntax for decoder configuration record 126 included in sample description 108 associated with video samples 110 and 11 in encapsulated video file 100 may be as follows in the example HEVC decoder configuration record shown below.

```
aligned(8) class HEVCDecoderConfigurationRecord {
        unsigned int(8) configurationVersion = 1;
        unsigned int(8) ProfileIndication;
        unsigned int(8) profileCompatibility;
        unsigned int(8) LevelIndication;
        bit(3) reserved = '111'b;
        bit(1) allSpsIncluded;
        bit(1) allPpsIncluded;
        bit(0) allVpsIncluded;
        ...
}
```

In the foregoing example, the allSpsIncluded indication is equal to 1, which can indicate that all SPSs for the video samples to which configuration record 126 applies, e.g. video samples 110 and 111, are included in decoder configuration record 126. The allPpsIncluded indication is equal to 1, which can indicate that all PPSs for the video samples to which configuration record 126 applies, e.g. video samples 110 and 111, are included in decoder configuration record 126. The allVpsIncluded indication, however, is equal to 0, which indicates that all VPSs for the video samples to which configuration record 126 applies, e.g. video samples 110 and 111, are not included in decoder configuration record 126. In the example of FIG. 3, VPSs 120 are included in parameter sets track 106.

A parameter set to be used in a picture or other portion of coded video data may need to be sent prior to the sample containing that picture or in the sample for that picture. However, depending on the nature of the information included in the parameter sets as well as the video samples with which the parameter sets are associated, it may be possible to transmit some of the parameter sets separately from the video data, e.g., some of the parameter sets may be transmitted out-of-band, as described above. Thus, it may be advantageous to individually indicate the locations of different types of parameter sets and, as illustrated in the example of FIG. 3, specify that, while SPSs 122 and PPSs 124 are included in decoder configuration record 126 of sample description 108, VPSs 120 are stored in parameter sets track 106 separate from video data such as video samples 110 and 111 with which VPSs 120 are associated.

FIG. 4 is a conceptual diagram illustrating another example video file 140 encapsulated by encapsulation unit 30. Video file 140 includes moov box 142, which includes video data track 144. In the example of FIG. 4, encapsulation unit 30 generates a separate parameter file 146, which includes parameter sets track 148. Video file 140 or other encapsulated video files in accordance with this disclosure can include many more than two tracks, including, multiple video and audio data tracks as well as multiple parameter set tracks. In FIG. 4, video data track 144 includes sample description 150 and an associated sequence of video samples including video samples 152 and 153. Video data track 144 can include more video samples and additional sample descriptions.

In the example of FIG. 4, sample description creation unit 66 generates sample description 150, including decoder configuration record 152. Additionally, decoder configuration record 152 includes flags allVpsIncluded, allSpsIncluded, and allPpsIncluded, individually indicating whether or not VPSs 154, SPSs, 156, and PPSs 158 are stored in sample description 150. In the example of FIG. 4, VPSs 154 are stored in parameter sets track 148 of parameter file 146, while SPSs 156 and PPSs 158 are stored in sample description 150 of video data track 144 of video file 140. Thus, in this example, it may be possible to transmit VPSs 154 separately from video data 140, e.g., transmit VPSs 154 out-of-band, as described above.

Sample descriptions associated with video samples in an encapsulated video file may include a name, which can be set to a number of different values. In some examples according to this disclosure, the name of a sample description may indicate the location of one or more parameter sets, e.g., may indicate whether or not one or more parameter sets of particular types are stored in the sample description. In one example, sample descriptions may include a number of either 'hvc1' or 'hev1.' In one example, for a sequence of video samples to which a particular sample description applies, the VPSs, SPSs, and PPSs, are stored only in the sample description when the sample description name is 'hvc1', and are stored in both the sample description and the samples when the sample description name is 'hev1'. In this manner, the name of the sample description, e.g. 'hvc1' or 'hev1', indicates where parameter sets are stored in the sample description or in the samples.

Storing parameter sets in the sample descriptions of a video stream provides a simple and static way to supply parameter sets. Storing parameters in samples, on the other hand, while possibly more complex, may allow for more flexibility, e.g., in the case of parameter set updates and in the case of adding additional parameter sets. A decoder initializes with the parameter sets in the sample description, and then updates using the parameter sets as they occur in the stream. Such updating may replace parameter sets with a new definition using the same identifier. Each time the sample description changes, the decoder re-initializes with the parameter sets included in the sample description.

In the foregoing implementation examples, the allSpsIncluded flag (or, alternatively, bit), when equal to 1, may indicate that all SPSs for the stream to which this configuration record applies are included in the sample description. When the sample description name is 'hvc1', the allSpsIncluded flag is typically set to 1. The allPpsIncluded flag, when equal to 1, likewise may indicate that all PPSs for the stream to which this configuration record applies are included in the sample description. Again, when the sample description name is 'hvc1', the allPpsIncluded flag is also typically set to 1. The allVpsIncluded flag, when equal to 1, may indicate that all VPSs for the stream to which this configuration record applies are included in the sample description. When the sample description name is 'hvc1', the allVpsIncluded flag is typically set to 1.

As an alternative to having both sample description names 'hvc1' and 'hev1', one of the two sample description names 'hvc1' and 'hev1' may be removed as a possibility for sample description names such that the remaining sample description name does not indicate where the parameter sets are stored. In such an example, the location of the parameters can be indicated independent of the sample description name by the three flags allSpsIncluded, allPpsIncluded and allVpsIncluded. Consequently, in this alternative, the semantics of the three flags can be as follows:

allSpsIncluded equal to 1 indicates that all SPSs for the stream to which this configuration record applies are included in the sample description independent of the name of the sample description.

allPpsIncluded equal to 1 indicates that all PPSs for the stream to which this configuration record applies are included in the sample description independent of the name of the sample description.

allVpsIncluded equal to 1 may indicates that all VPSs for the stream to which this configuration record applies are included in the sample description independent of the name of the sample description.

Alternatively (to any of the above listed alternatives), some aspects of the techniques may provide that, when the allSpsIncluded flag is equal to 0, at least one SPS for the stream to which this configuration record applies is not included in the sample description. Likewise, some aspects of the techniques may provide that, when the allPpsIncluded flag is equal to 0, at least one PPS for the stream to which this configuration record applies is not included in the sample description. Moreover, some aspects of the techniques may provide that, when the allVpsIncluded flag is equal to 0, at least one VPS for the stream to which this configuration record applies is not included in the sample description.

Figure 5:
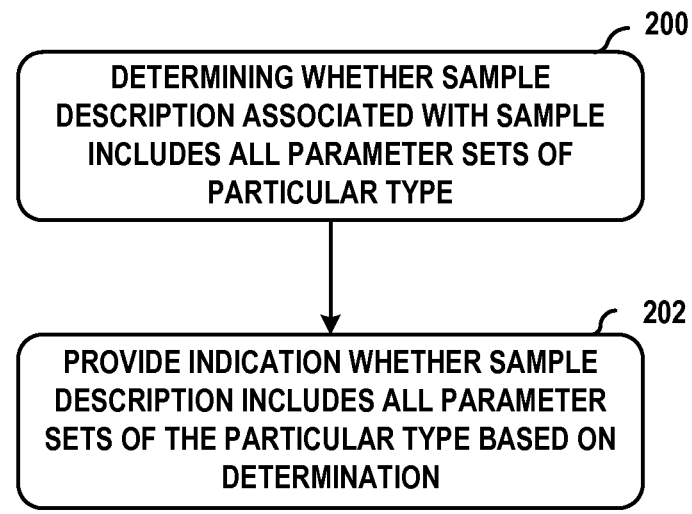
FIG. 5 is a flowchart illustrating an example method of storing coded video data in an electronic file.

FIG. 5 is a flowchart illustrating an example method of storing coded video data in an electronic file. The method of FIG. 5 includes determining whether a sample description associated with at least one sample includes all parameter sets of a particular type associated with the at least one sample (200) and providing, in the electronic file, an indication indicating whether the sample description includes all parameter sets of the particular type based on the determination (202). The at least one sample includes at least a portion of a plurality of sequences of coded video pictures in the electronic file. The particular type is one of a plurality of different particular types of parameter sets. The functions of the example method of FIG. 5 are described in more detail below with reference to the example method of FIG. 6, which illustrates an example method of processing coded video data in accordance with this disclosure.

Figure 6:
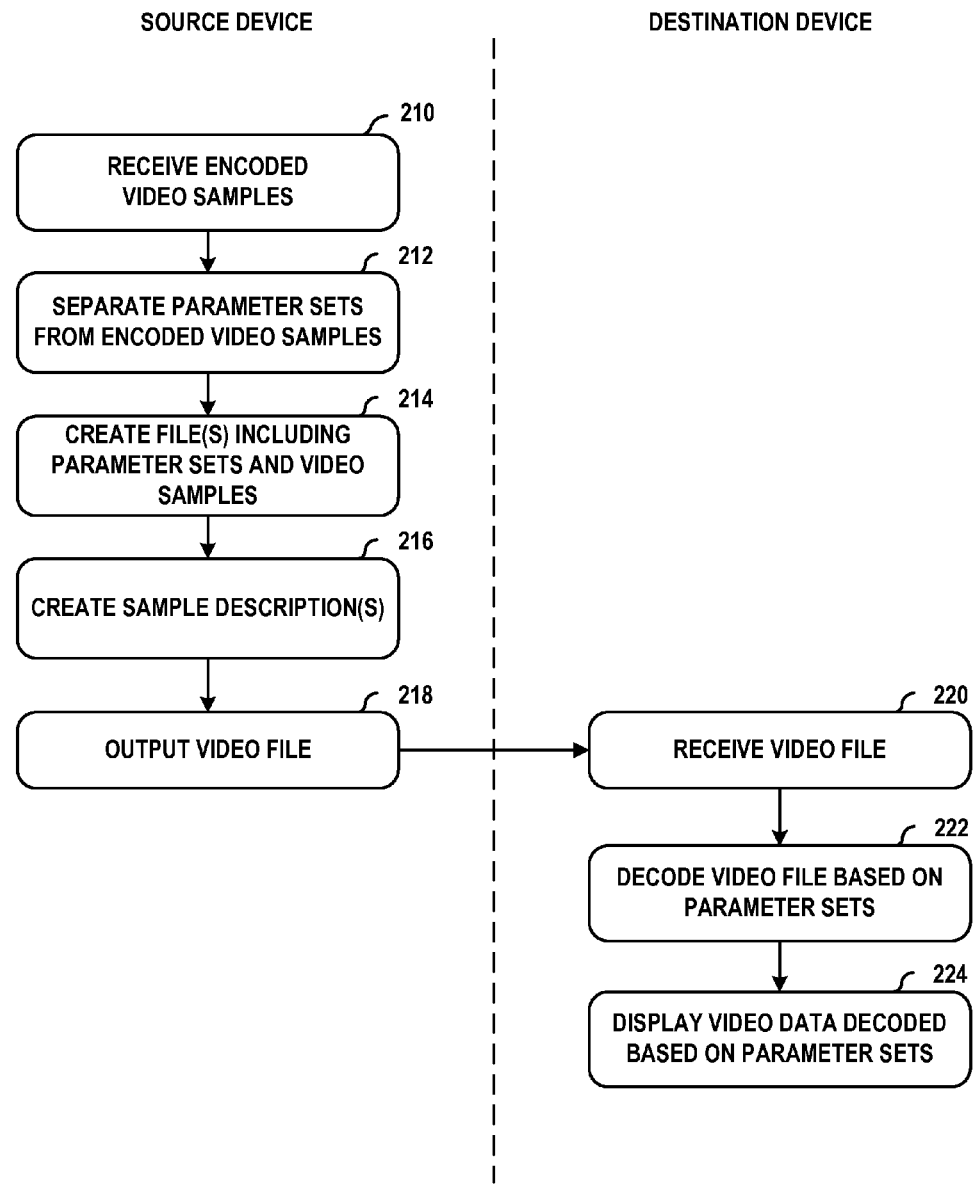
FIG. 6 is a flowchart illustrating an example method of processing coded video data.

FIG. 6 is a flowchart illustrating an example method of processing coded video data. Although described with respect to the components of source device 20 and destination device 40 (FIG. 1) for purposes of example and explanation, it should be understood that any suitable device may implement the techniques of FIG. 6.

Initially, encapsulation unit 30 may receive a sequence of encoded video pictures (210). An encoder, such as video encoder 28, may have included parameter sets of different types with the coded video samples, including, e.g., VPSs, SPSs, and PPSs. Additionally or alternatively, encapsulation unit 30 may create parameter sets separately from video encoder 28. In any case, encapsulation unit 30 may separate parameter sets data from coded video pictures with which the parameter sets are associated (212). For example, parameter sets extraction unit 64 of video file creation unit 60 of encapsulation unit 30 can separate the parameter sets data from coded video pictures with which the parameter sets are associated.

That is, encapsulation unit 30 may create a video file including parameter sets and coded video pictures with which the parameter sets are associated (214). In doing so, however, encapsulation unit 30 may store one or more of the parameter sets separately from the coded video pictures with which the parameter sets are associated. In this manner, the parameter sets may be transmitted and processed separately of the coded video pictures. For example, in accordance with the techniques of this disclosure, encapsulation unit 30 may store one or more parameter sets in a parameter set track of the created video file or of another file separate from the video file. In another example, encapsulation unit 30 may store one or more of the parameter sets in one or more sample descriptions associated with coded video pictures.

Encapsulation unit 30, e.g., sample description creation unit 66 of encapsulation unit 30 can be configured to generate one or more sample descriptions associated with the coded video pictures included in the encapsulated video file (216). As part of this process, sample description creation unit 66 can be configured to determine the location of different types of parameter sets and provide indications in a sample description regarding whether all parameter sets of a particular type are stored in the sample description, as described above with reference to the examples of video files 100 and 140 of FIGS. 3 and 4, respectively.

Encapsulation unit 30 may then output the video file (218). For example, encapsulation unit 30 may cause source device 20 to write the video file to a storage medium, such as, for example, an optical disc, a floppy disk, a flash drive, a hard drive, a solid state drive, or other storage medium. Such storage media may be physically transported to destination device 40. Alternatively, source device 20 may transmit the video file to destination device 40, e.g., via broadcast, network transmission, or other transmission techniques. In any case, destination device 40 may ultimately receive the video file (220).

In some examples, source device 20 may provide distinct portions of the video file to destination device 40, e.g., in response to one or more HTTP-Get or partial-Get requests issued by destination device 40 to source device 20. Destination device 40 may issue a first HTTP-Get or partial-Get request to source device 20 to retrieve a sequence data set, e.g., all or a portion of a parameter set track including sequence level SEI messages, and a second (or more) HTTP-Get or partial-Get request(s) to retrieve coded video pictures described by the sequence data set.

After receiving the video file, destination device 40 may decode the video file based on the parameter sets (222). That is, video decoder 48 may use data of the parameter sets, including one or more of VPSs, SPSs, and PPSs to assist in the decoding process. In one example, video decoder 48 analyzes sample descriptions associated with one or more sets of coded video pictures included in the video file received from source device 20. For example, video decoder 48 can receive a sample description including flags, e.g. allSpsIncluded, allPpsIncluded and allVpsIncluded flags, individually indicating whether SPSs, PPSs, and VPSs are included in the sample description. Depending on the indications provided in the sample description, video decoder can retrieve or otherwise reference the parameter sets to decode the video included in the video file received from source device 20.

In one example, encapsulation unit 30 of source device 20 stores all VPSs in a parameter file separate from the video file and transmits the parameter file to destination device 40 before transmitting the video file. Video decoder 48 can reference sample descriptions, including reference the decoder configuration record with respect to different sets of video samples and determine, based on indications provided in the decoder configuration record, that all VPSs are not stored in the sample description. In such an example, video decoder 48 can retrieve or otherwise reference the VPSs included in the parameter file provided by source device 20 separate from the video file.

In one or more examples, the functions, methods, and techniques described in this disclosure may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of storing coded video data comprising a plurality of sequences of coded video pictures in an electronic file, the method comprising:
   determining, for a sample description that is in a video data track and associated with at least one sample, whether the sample description in the video track includes all parameter sets of a particular type associated with the at least one sample or whether at least one parameter set of the particular type is included outside the sample description in the video track, wherein the at least one sample comprises at least a portion of the plurality of sequences of coded video pictures, and wherein the particular type is one of a plurality of different particular types of parameter sets, each of the different particular types of parameter sets corresponding to a respective hierarchical layer of video data; and
   providing, in the electronic file, an indication indicating whether the sample description includes all parameter sets of the particular type based on the determination.

2. The method of claim 1, wherein the plurality of different particular types of parameter sets comprises one or more of sequence parameter sets (SPSs) corresponding to a respective sequence of pictures as the respective hierarchical layer, picture parameter sets (PPSs) corresponding to a respective picture as the respective hierarchical layer, and video parameter sets (VPSs) corresponding to a respective entire coded video sequence as the respective hierarchical layer.

3. The method of claim 1, wherein determining whether the sample description includes all parameter sets of the particular type comprises:
   determining a name associated with the sample description; and
   determining whether the sample description includes all parameter sets of the particular type based on the name associated with the sample description.

4. The method of claim 3,
   wherein the determined name associated with the sample description is 'hvc1,' and
   wherein determining whether the sample description includes all parameter sets of the particular type comprises determining that the sample description includes all parameter sets of the particular type when the sample is named 'hvc1.'

5. The method of claim 3,
   wherein the determined name associated with the sample description is 'hev1,' and
   wherein determining whether the sample description includes all parameter sets of the particular type comprises determining that the sample description does not include all parameter sets of the particular type when the sample is named 'hev1.'

6. The method of claim 1, further comprising associating, in the electronic file, a name with the sample description, wherein the name does not indicate whether the sample description includes all parameter sets of the particular type.

7. The method of claim 1, wherein providing, in the electronic file, an indication indicating whether the sample description includes all parameter sets of the particular type comprises providing, in the electronic file, an indication indicating that the sample description does not include all parameter sets of the particular type based on the determination.

8. The method of claim 1, wherein providing, in the electronic file, an indication indicating whether the sample description includes all parameter sets of the particular type comprises providing, in the electronic file, an indication indicating that the sample description does include all parameter sets of the particular type based on the determination.

9. The method of claim 1, wherein providing, in the electronic file, an indication indicating whether the sample description includes all parameter sets of the particular type comprises providing, in the electronic file, an indication indicating whether a decoder configuration record of the sample description includes all parameter sets of the particular type based on the determination.

10. The method of claim 1, wherein all parameter sets of the particular type comprises all parameter sets of a first type of the plurality of different particular types of parameter sets, wherein the indication in the file comprises a first indication in the file, and the method further comprising:
    determining whether the sample description includes all parameter sets of a second particular type of the plurality of different particular types of parameter sets associated with the at least one sample; and
    providing, in the electronic file, a second indication indicating whether the sample description includes all parameter sets of the second type based on the determination.

11. The method of claim 10,
    wherein the first indication in the file indicates whether the sample description includes all parameter sets of the first type,
    wherein providing, in the electronic file, the first indication indicating whether the sample description includes all parameter sets of the first type comprises providing, in the electronic file, an indication indicating that the sample description does not include all parameter sets of the first type based on the determination, and
    wherein providing, in the electronic file, the second indication indicating whether the sample description includes all parameter sets of the second particular type comprises providing, in the electronic file, an indication indicating that the sample description does include all parameter sets of the second type based on the determination.

12. An apparatus for storing coded video data comprising a plurality of sequences of coded video pictures in an electronic file, the apparatus comprising:
    a memory configured to store the electronic file; and
    at least one processor configured to:
      determine, for a sample description that is in a video data track and associated with at least one sample, whether the sample description in the video track includes all parameter sets of a particular type associated with the at least one sample or whether at least one parameter set of the particular type is included outside the sample description in the video track, wherein the at least one sample comprises at least a portion of the plurality of sequences of coded video pictures, and wherein the particular type is one of a plurality of different particular types of parameter sets, each of the different particular types of parameter sets corresponding to a respective hierarchical layer of video data; and
      provide, in the electronic file, an indication indicating whether the sample description includes all parameter sets of the particular type based on the determination.

13. The apparatus of claim 12, wherein the plurality of different particular types of parameter sets comprises one or more of sequence parameter sets (SPSs) corresponding to a respective sequence of pictures as the respective hierarchical layer, picture parameter sets (PPSs) corresponding to a respective picture as the respective hierarchical layer, and video parameter sets (VPSs) corresponding to a respective entire coded video sequence as the respective hierarchical layer.

14. The apparatus of claim 12, wherein the at least one processor is configured to determine whether the sample description includes all parameter sets of the particular type at least by:
   determining a name associated with the sample description; and
   determining whether the sample description includes all parameter sets of the particular type based on the name associated with the sample description.

15. The apparatus of claim 14,
   wherein the determined name associated with the sample description is 'hvc1,' and
   wherein the at least one processor is configured to determine that the sample description includes all parameter sets of the particular type when the sample is named 'hvc1.'

16. The apparatus of claim 14,
   wherein the determined name associated with the sample description is 'hev1,' and
   wherein the at least one processor is configured to determine that the sample description does not include all parameter sets of the particular type when the sample is named 'hev1.'

17. The apparatus of claim 12, wherein the at least one processor is configured to associate, in the electronic file, a name with the sample description, wherein the name does not indicate whether the sample description includes all parameter sets of the particular type.

18. The apparatus of claim 12, wherein the at least one processor is configured to provide, in the electronic file, an indication indicating that the sample description does not include all parameter sets of the particular type based on the determination.

19. The apparatus of claim 12, wherein the at least one processor is configured to provide, in the electronic file, an indication indicating that the sample description does include all parameter sets of the particular type based on the determination.

20. The apparatus of claim 12, wherein the at least one processor is configured to provide, in the electronic file, an indication indicating whether a decoder configuration record of the sample description includes all parameter sets of the particular type based on the determination.

21. The apparatus of claim 12, wherein all parameter sets of the particular type comprises all parameter sets of a first type of the plurality of different particular types of parameter sets, wherein the indication in the file comprises a first indication in the file, and wherein the at least one processor is configured to:
   determine whether the sample description includes all parameter sets of a second type of the plurality of different particular types of parameter sets associated with the at least one sample; and
   provide, in the electronic file, a second indication indicating whether the sample description includes all parameter sets of the second type based on the determination.

22. An apparatus for storing coded video data comprising a plurality of sequences of coded video pictures in an electronic file, the apparatus comprising:
   means for determining, for a sample description that is in a video data track and associated with at least one sample, whether the sample description in the video track includes all parameter sets of a particular type associated with the at least one sample or whether at least one parameter set of the particular type is included outside the sample description in the video track, wherein the at least one sample comprises at least a portion of the plurality of sequences of coded video pictures, and wherein the particular type is one of a plurality of different particular types of parameter sets, each of the different particular types of parameter sets corresponding to a respective hierarchical layer of video data; and
   means for providing, in the electronic file, an indication indicating whether the sample description includes all parameter sets of the particular type based on the determination.

23. The apparatus of claim 22, wherein the plurality of different particular types of parameter sets comprises one or more of sequence parameter sets (SPSs) corresponding to a respective sequence of pictures as the respective hierarchical layer, picture parameter sets (PPSs) corresponding to a respective picture as the respective hierarchical layer, and video parameter sets (VPSs) corresponding to a respective entire coded video sequence as the respective hierarchical layer.

24. The apparatus of claim 22, further comprising means for determining whether the sample description includes all parameter sets of the particular type at least by:
   determining a name associated with the sample description; and
   determining whether the sample description includes all parameter sets of the particular type based on the name associated with the sample description.

25. A non-transitory computer-readable storage medium having stored thereon instructions that when executed cause one or more processors to perform operations comprising:
   determine, for a sample description that is in a video data track and associated with at least one sample, whether the sample description in the video track includes all parameter sets of a particular type associated with the at least one sample or whether at least one parameter set of the particular type is included outside the sample description in the video track, wherein the at least one sample comprises at least a portion of a plurality of sequences of coded video pictures, and wherein the particular type is one of a plurality of different particular types of parameter sets, each of the different particular types of parameter sets corresponding to a respective hierarchical layer of video data; and
   provide, in an electronic file, an indication indicating whether the sample description includes all parameter sets of the particular type based on the determination.

26. A method of processing coded video data comprising a plurality of sequences of coded video pictures stored in an electronic file, the method comprising:
   receiving an indication in the file indicating, for a sample description that is in a video data track and associated with at least one sample, whether the sample description in the video track includes all parameter sets of a particular type associated with the at least one sample or whether at least one parameter set of the particular type is included outside the sample description in the video track, wherein the at least one sample comprises at least a portion of the plurality of sequences of coded video pictures, and wherein the particular type is one of a plurality of different particular types of parameter sets, each of the different particular types of parameter sets corresponding to a respective hierarchical layer of video data; and determining whether all parameter sets of the particular type are stored in the sample description based on the indication; and processing the coded video data based at least in part on one or more of the parameter sets of the particular type based on the determination of whether all parameter sets of the particular type are stored in the sample description.

27. An apparatus for processing coded video data comprising a plurality of sequences of coded video pictures stored in an electronic file, the apparatus comprising:

a memory configured to store the electronic file; and
at least one processor configured to:
receive an indication in the file indicating, for a sample description that is in a video data track and associated with at least one sample, whether the sample description in the video track includes all parameter sets of a particular type associated with the at least one sample or whether at least one parameter set of the particular type is included outside the sample description in the video track, wherein the at least one sample comprises at least a portion of the plurality of sequences of coded video pictures, and wherein the particular type is one of a plurality of different particular types of parameter sets, each of the different particular types of parameter sets corresponding to a respective hierarchical layer of video data; and determine whether all parameter sets of the particular type are stored in the sample description based on the indication; and process the coded video data based at least in part on one or more of the parameter sets of the particular type based on the determination of whether all parameter sets of the particular type are stored in the sample description.

28. The apparatus of claim 27, further comprising a decoder device, and wherein the decoder device is configured to process the coded video data based at least in part on one or more of the parameter sets of the particular type at least by decoding the coded video data based at least in part on one or more of the parameter sets of the particular type.

29. The method of claim 1, wherein the respective hierarchical layers of video data include an entire coded video sequence, a sequence of pictures, and a picture.

* * * * *